April 27, 1943.   A. S. VOLPIN   2,317,657
CONDUIT VALVE
Filed Jan. 3, 1942   2 Sheets-Sheet 1

A. S. VOLPIN
INVENTOR.

BY Lester B. Clark
ATTORNEY

April 27, 1943.     A. S. VOLPIN     2,317,657
CONDUIT VALVE
Filed Jan. 3, 1942     2 Sheets-Sheet 2

A. S. VOLPIN
INVENTOR.

BY Lester B. Clarke
ATTORNEY.

Patented Apr. 27, 1943

2,317,657

UNITED STATES PATENT OFFICE 2,317,657

CONDUIT VALVE

Alexander S. Volpin, Houston, Tex.

Application January 3, 1942, Serial No. 425,499

10 Claims. (Cl. 251—20)

The invention relates to a two way conduit valve wherein it is intended that a seal will be maintained even though high pressures are applied to the valve and wherein the valve will be capable of easy operation at all times.

It is one of the objects of the invention to provide a valve having a two part gate which is adapted to engage seat plates in the valve housing and to provide a sealing material for distribution between the seat plates and the housing and between the gate and the seat plates.

Another object of the invention is to apply a sealing material between a sealing plate and a valve housing on the downstream side of the valve by the application of pressure from the upstream side of the valve.

Another object of the invention is to provide a mechanism for conducting lubricant from the gate chamber to the area between a seating plate and the valve housing.

Still another object of the invention is to provide a lubricating system for gate valves wherein both the gate and the seat which it engages are sealed by lubricant relative to each other and to the valve housing.

Still another object of the invention is to provide a gate valve having a two part gate wherein the parts are wedged in closed position by a mechanism carried by the valve stem.

Still another object of the invention is to provide a wedge rod for two part gate members which is slidable with the gate but is stopped by the stem to effect the wedging action of the gate member.

Other and further objects of the invention will be readily apparent when the following description is considered in connection with the accompanying drawings wherein.

Figure 1:
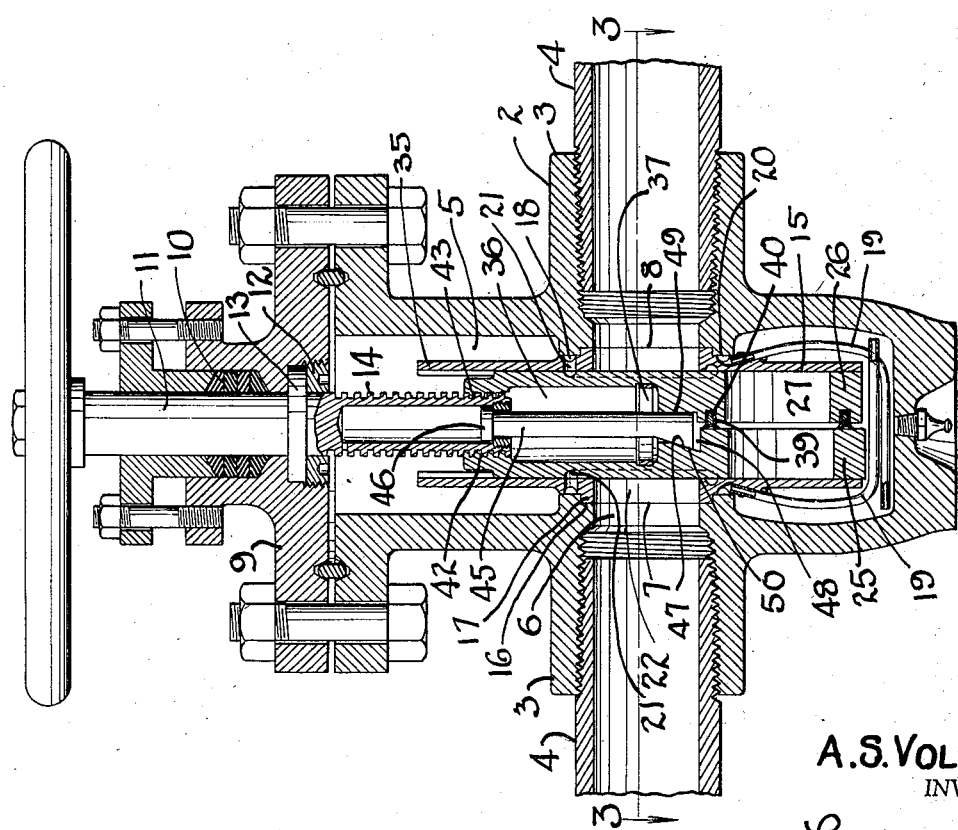
Fig. 1 is a vertical sectional view of the valve with the gate in closed position.

In Fig. 1 the valve housing is shown at 2 and is preferably made as a unitary structure having the bosses 3 thereon to receive the conduit pipes 4 which are shown as threaded into the bosses 3. It is understood, of course, that flange connections may be used.

The housing 2 is hollow to provide a chamber 5 which is intersected by the flow passage 6 so that the ports 7 and 8 are thus provided.

The top of the housing 2 is closed by a cap or bonnet 9 carrying a stuffing box 10. A stem 11 is rotatably mounted in the bonnet and is held against axial movement by the ring 12 confining the flange 13 on the stem. The stem is hollow and has a set of threads 14 on the lower end which projects into the chamber 5.

Figure 3:
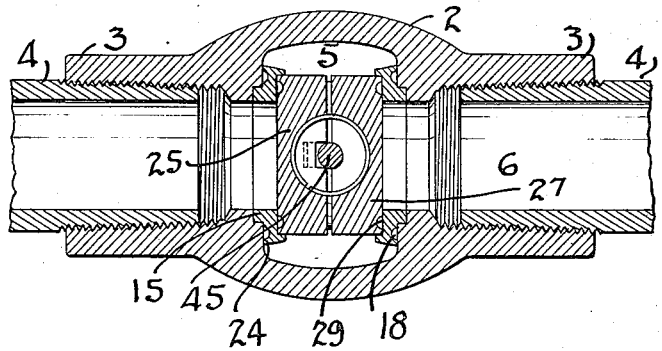
Fig. 3 is a section taken on the line 3—3 of Fig. 1 and looking in the direction of the arrows.
Figure 4:
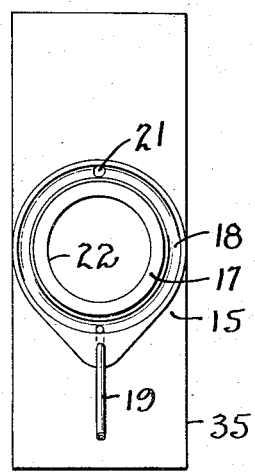
Fig. 4 is a back side elevation of one of the seating plates.
Figures 5, 6:
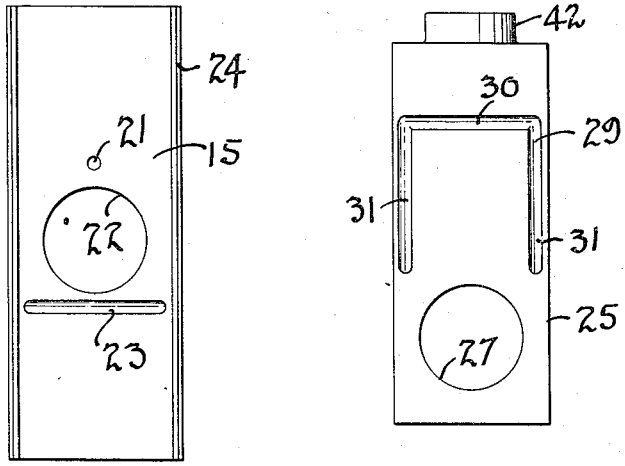
Fig. 5 is a front elevation of the seating plate.
Fig. 6 is a side elevation of one of the faces of the gate.
Figure 7:
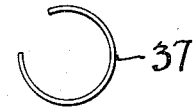
Fig. 7 is a view of a spring ring to separate the gate parts.

The ports 7 and 8 are each arranged to receive a combination seat, guide and lubrication plate 15, the port being recessed at 16 to receive the rib 17 of the plate. The plate is of peculiar construction as seen in section in Fig. 3 and in front and rear elevation in Figs. 5 and 4 respectively. The rib 17 engages in the recess 16 so as to accurately locate the plate and around the rib 17 there is provided a lubricant or sealing material distribution groove 18. This groove is to receive its supply of material from a pipe 19 connected into the back edge of the plate, as seen in Fig. 4. The groove 18 extends about the inwardly facing rib 20 in the housing about the port 7 so that when lubricant is introduced into the groove 18 a complete seal will be made around the port. The opening 21 leads from the groove 18 directly thru the plate to the front side, as seen in Fig. 5. The plate has an opening 22 therein which is arranged to mate into alignment with the passage 6 thru the valve and the front face of this plate also has a distribution groove at 23 which is shown as being transverse of the plate below the opening 22 and entirely independent of the passage 21. The front face of the plate is provided with the edge flanges 24 which are best seen in Fig. 3. There are two of these plates 15, one positioned in each of the ports 7 and 8.

The gate member is a two part construction having two parts 25 and 26 which are substantially identical in that each one of them is an elongated member having an opening 27 therethru which is arranged to be moved into alignment with the passage 6 and the opening 22 in the housing and guide plate respectively.

The outer or seating face of each of the valve parts 25 and 26 is provided with an inverted U-shaped distribution groove 29 spaced above the opening 27 in such a position that when the valve is in closed position as seen in Fig. 1 that the top or horizontal part 30 of the groove will be in alignment with the opening 21 in the guide plate so that sealing material may pass into this portion 30 and down the side legs 31 and thence into the transverse groove 23 in the face of the guide plate 15. Thus, when the gate is in closed position, as seen in Fig. 1 the opening 22 and port 7 will be completely encircled by a distribution groove having a rectangular configuration and composing the groove 29 and the groove 23. Thus, while the valve is closed there will be a complete seal about the port.

Figure 2:
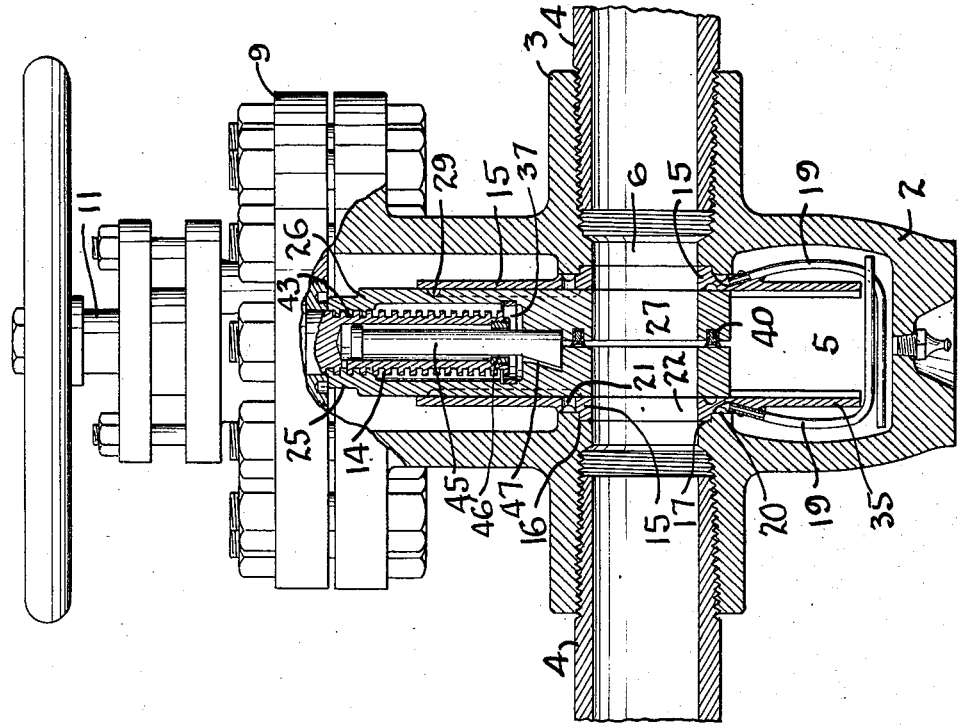
Fig. 2 is a vertical sectional view of the valve with the gate in open position.

When the valve is moved to open position, as seen in Fig. 2, it will be apparent that the legs 31 move out of engagement with the groove 23 and the transverse portion 30 also moves out of engagement with the opening 21, so that the flow of sealing material is instantly cut off when an attempt is made to open the valve and during the entire time that the valve is open the flow of lubricant will be cut off. When the valve is again closed, however, the sealing or lubrication system is connected to form a complete seal. It will be noted as seen in Figs. 1 and 2, that the pipes 19 extend into the lowermost portion of the chamber 5 and it is intended that the entire chamber 5 can be filled with lubricant or sealing material. Thus, when the valve moves from open to closed position, there will be a surge of this lubricant or sealing material around the sides of the valve thru the side of the chamber, as seen in Fig. 3.

If the valve is placed in use in a vertical position, as seen in Fig. 1, if any sealing material or lubricant remains in the chamber, it will tend to move into the downstream pipe 19 to provide a seal between the seat and the housing and between the seat and gate on the downstream side where the pressure is lower. On the other hand, if the valve is placed in a horizontal position, the pipes will also tend to pick up any lubricant that is present in the chamber. If the valve is to be used with the handle portion down, then, of course, the pipe 19 could be extended to any desired location so as to insure a flow of lubricant.

The lubricant in the chamber 5 will be subjected to any pressure leaking past the high pressure side of the valve. This pressure will, of course, be equalized between the chamber and the sealing connections on the high pressure side but there will be a tendency for the sealing material to flow thru the pipe to the distributing system on the low pressure side so that where the arrangement is that of Fig. 1, the valve may be used as a two way valve in that either side may be the high pressure side.

It will be noted that the plates 15 have the extension 35 thereon on opposite sides and these extensions are of sufficient length that they enclose the gate parts 25 and 26 at all times to a sufficient extent to cover the openings 21 and the sealing grooves 29. In this manner there will be no loss of lubricant into the passage thru the valve.

The upper portion of each of the valve parts 25 and 26 is hollowed out at 36 and a spring ring 37 is disposed in these recesses to normally urge the parts away from each other and against the sealing faces of the plates 15. A circular packing 39 is arranged in a groove 40 in one of the gate parts so as to form a seal about the opening 27.

In order to raise and lower the gate parts, each of them has a threaded area 42 thereon to engage the threads 14 on the stem. The particular threads 43 on one of the gate parts, however, have thin crests or ribs so that there will be some play or lost motion between that part and the stem. This is clearly seen in Figs. 1 and 2 of the drawings. This lost motion or play is provided to permit a relative sliding movement between the gate parts, and also between one of the gate parts and the stem.

The stem carries a wedge rod 45 having a head 46 thereon which is confined in the lower end of the valve stem by a retainer ring 46'. This rod is slidable in the valve stem and has an enlarged or wedge face 47 thereon at one side on the lower end. The rod is arranged to be received in a recess 48 formed in two valve parts, with one part having a straight face 49 to contact one side of the rod and the other valve part has a tapered face 50 to engage the wedge portion 47 on the rod. The rod is normally moved with the gate parts and will be elevated as seen in Fig. 2 when the gate is open. As the gate parts move downwardly, however, toward the position seen in Fig. 1, the gate parts and the rod move downwardly until the movement of the rod is arrested by the stop ring 46'. Continued turning of the stem causes the gate parts to continue their movement until the wedging action separates them and causes them to be locked in closed position, as seen in Fig. 1. When an attempt is made to open the valve the lost motion of the threads 43 allows that part of the gate to remain stationary while an opposing part 25 is caused to move slightly. This slight movement relieves the wedge action, releases the gate parts and permits the valve to be readily opened.

It is intended that the valve may be used in a horizontal position as a master valve on an oil or gas well or as a flow valve in vertical position on Christmas tree wing. In this event it is probable that only a one way valve might be desired and the special seat type of plate may be provided only on the downstream or low pressure side.

Broadly the invention contemplates a two way conduit valve wherein both the valve parts and the valve seats are sealed with a lubricant material and the valve parts wedged in closed position.

What is claimed is:

1. A gate valve including a housing, a chamber therein, a movable gate in said chamber, means to move said gate, upstream and downstream flow ports through the housing opening into said chamber, means to inject plastic sealing material into said chamber, a seat plate at each port, a sealing area including a groove between said housing and each of said plates, and means to conduct plastic sealing material from adjacent the lower portion of said chamber to each of said grooves and said areas, whereby pressure fluid leaking into said chamber from the line controlled by the valve may act on said sealing material to force it through the said conducting means leading to the groove and plate at the downstream flow port when the valve is closed.

2. A gate valve including a housing, a chamber therein, a movable gate in said chamber, means to move said gate, upstream and downstream flow ports in the housing chamber, a lubrication and seat plate at each port, means responsive to line pressure leaking into said chamber from the upstream side of the valve when the valve is in closed position to feed plastic sealing material to the area between the housing and the plate at the downstream port, a groove between at least one of said seat plates and said gate, and additional means to conduct sealing material to said groove from said second means to provide a seal between the plate and gate.

3. A gate valve including a housing, a chamber therein, a movable gate in said chamber, means to move said gate, upstream and downstream flow ports in the housing chamber, a lubrication and seat plate at each port, means responsive to line pressure leaking into said chamber from the upstream side of the valve when the valve is in closed position to feed plastic sealing material to the area between the housing and the plate at the downstream port, a groove between at least one of said seat plates and said gate, and additional means to conduct sealing material to said groove from said second means to provide a seal between the plate and gate, said plate having opposite extension portions to enclose the sides of the gate.

4. A gate valve including a housing, a chamber therein, a movable gate in said chamber, means to move said gate, upstream and downstream flow ports in the housing chamber, a lubrication and seat plate at each port, means responsive to line pressure leaking into said chamber from the upstream side of the valve when the valve is in closed position to feed plastic sealing material to the area between the housing and the plate at the downstream port, a groove between at least one of said seat plates and said gate, and additional means to conduct sealing material to said groove from said second means to provide a seal between the plate and gate, said additional means including an opening from said second means to the sealing face to conduct sealing material to the gate.

5. A gate valve including a housing, a chamber therein, a movable gate in said chamber, means to move said gate, upstream and downstream flow ports in the housing chamber, a lubrication and seat plate at each port, means responsive to line pressure leaking into said chamber from the upstream side of the valve when the valve is in closed position to feed plastic sealing material to the area between the housing and the plate at the downstream port, a groove between at least one of said seat plates and said gate, and additional means to conduct sealing material to said groove from said second means to provide a seal between the plate and gate, said groove including a distribution groove on the face of the gate.

6. A gate valve including a housing, a gate chamber therein, ports in the housing to said chamber, a gate to close said ports, means to move the gate, a seat member in the chamber about the downstream port and in engagement with the housing and with the gate, means to introduce a plastic sealing material into the chamber, means to conduct such material from the low side of the chamber to the area between said member and housing in response to pressure leaking into the chamber, and additional means to conduct such material from such area to that between the member and gate.

7. A lubricated gate valve including a housing having a flow passage therethrough, said housing forming a sealing material reservoir, means to inject sealing material into said reservoir, a valve member adapted to be reciprocated in said housing to open and close the flow passage, a groove around the flow passage at the outlet side to receive the sealing material responsive to the pressure entering the housing from the inlet side when the valve member is in closed position, and means to conduct sealing material from the reservoir to said groove, said means including a conduit from said reservoir to said groove.

8. A gate valve for the control of flow upwardly through a pipe or conduit in substantially vertical position where the gate of the valve will move substantially horizontally including a housing, a gate chamber therein, a gate member disposed in said chamber, said chamber also forming a reservoir for sealing material, means to move said gate, a sealing means for the upper side of the valve, and means to conduct sealing material from adjacent the lower portion of said chamber to said sealing means.

9. A gate valve for the control of flow upwardly through a pipe or conduit in substantially vertical position where the gate of the valve will move substantially horizontally including a housing, a gate chamber therein, a gate member disposed in said chamber, said chamber also forming a reservoir for sealing material, means to move said gate, a sealing means for the upper side of the valve, and means responsive to line pressure to conduct sealing material from adjacent the lower portion of said chamber to said sealing means.

10. A gate valve including a housing, a chamber therein, a movable gate in said chamber, means to move said gate, upstream and downstream flow ports through the housing opening into said chamber, means to inject plastic sealing material into said chamber, a seat plate at each port, a sealing area including a groove between said gate and each of said plates, and means to conduct plastic sealing material from adjacent the lower portion of said chamber to each of said grooves and said areas, whereby pressure fluid leaking into said chamber from the line controlled by the valve may act on said sealing material to force it through the said conducting means leading to the groove at the downstream flow port when the valve is closed.

ALEXANDER S. VOLPIN.